United States Patent [19]

Petro

[11] Patent Number: 4,879,738
[45] Date of Patent: Nov. 7, 1989

[54] DIGITAL TELEPHONY CARD FOR USE IN AN OPERATOR SYSTEM

[75] Inventor: John F. Petro, Raleigh, N.C.

[73] Assignee: Northern Telecom Limited, Montreal, Canada

[21] Appl. No.: 311,288

[22] Filed: Feb. 16, 1989

[51] Int. Cl.⁴ .............................................. H04B 3/20
[52] U.S. Cl. ............................................. 379/3; 379/6; 379/223; 370/32.1
[58] Field of Search ................. 379/6, 218, 223, 210, 379/3, 457, 1, 340, 345, 347, 4, 392, 404; 370/32.1

[56] References Cited

U.S. PATENT DOCUMENTS

| | | | |
|---|---|---|---|
| 4,445,002 | 4/1984 | Terry | 179/81 A |
| 4,484,322 | 11/1984 | Fossati | 370/32 |
| 4,602,133 | 7/1986 | O'Neill | 179/170.2 |
| 4,677,609 | 6/1987 | Piereth | 370/60 |
| 4,825,459 | 4/1989 | Farrow et al. | 379/3 |

Primary Examiner—Stafford D. Schreyer
Attorney, Agent, or Firm—Shlesinger & Myers

[57] ABSTRACT

A device for establishing a desired operator audio level in an operator position means, is disclosed, comprising a processor means for processing digital signals for generating a desired receive audio level in an operator position means for use by an operator, conversion means for converting analog speech transmit signal from a telephone transmit means to digital for input to said processor means and for converting digital receive signal from the processor means to analog receive signal for input to a telephone receive means, and means for connecting the processor means to a telecommunications network. The processor means includes control means for the operator for permitting the operator to modify the desired receive audio level.

32 Claims, 9 Drawing Sheets

DIGITAL TELEPHONY CARD FOR USE IN AN OPERATOR SYSTEM

FIELD OF THE INVENTION

The present invention pertains to an operator position in an operator office for assisting a subscriber and particularly to an operator position having digital telephony means for controlling echo and other audio features and for providing maintenance features.

BACKGROUND OF THE INVENTION

An operator position is used by an operator in an operator office for assisting subscribers connected to the network to make a call or to answer their questions. An operator position must meet several criteria which are standard in the industry pertaining to transmit and receive signals to protect the 5 operator who uses the operator position all day. These criteria specify sidetone level, volume level, acoustic limiting and echo control.

Sidetone is a portion of operator speech which is fed back to the receive path to permit the operator to hear his own voice. The feedback operator speech is attenuated to prevent the operator from lowering his own voice and preventing sufficient signal levels from being transmitted. Echo from an operator's voice signal in a telephone system can occur at the junction of a four-wire to a two-wire interface. Echo control involves calculating the maximum allowable level of echo from the level of the operator's transmit speech and inserting loss in the receive path at the estimated time of arrival of the echo. Acoustic limiting looks for high tones in the receive path and inserts loss to attenuate the high tones to protect the operator's hearing. Volume control allows for lowering or increasing the volume level of incoming voice signals.

Previous devices implemented these various controls utilizing analog circuit means, which were relatively harder and more expensive to manufacture. For example, in a typical analog circuit means, there are four potentiometers required to be adjusted at manufacture. If these adjustments were off, field adjustments were normally not practicably feasible. Thus, the quality of delivered devices might suffer, resulting in some los in customer goodwill.

An operator office has been identified as a revenue generator for a telephone company, prompting the company to look for ways and methods to maximize revenue. One method is to improve the audio characteristics of the operator position so that the operator using the position will hear clearly questions raised by the subscriber at the other end of the line, without having to ask the subscriber to repeat the question. It has been found for one telephone company that for every one-tenth of a second increase in average call time that operators waste is lost revenue in the amount of approximately $400,000 per year. Thus, it is seen that having clear audio characteristics in an operator position is important.

Echo control in previous devices utilized the standard attack time of approximately 100 milliseconds and release time of approximately 100 milliseconds. Echo control is achieved by inserting loss in the receive path. Attack time means time at which one-half of the required loss is inserted from the time of appearance of speech in the transmit path and release time is time at which one-half of the inserted loss is removed from the time of disappearance of speech in the transmit path.

The attack and release times are not adjustable once set at manufacture. For most situations covering standard distances between the operator position and the subscriber's end office, these attack and release times were generally adequate. However, in a situation where an operator office is tasked to serve an end office outside of its standard range, these attack and release times are not adequate. The result is that no echo control is achieved.

Maintenance of an operator position having the analog circuit means is complicated because the standard telephone transmission test equipment is not compatible with the operator headset interface normally found in operator positions. The equipment does not have a setting for a 50 Ohm source impedance and/or 300 Ohm load impedance. This means that the meter level reading for receiving test tone at the operator position is not consistent with the transmission level point assigned to the operator headset receive. Moreover, the test tone injected into the headset transmit will register at the central office at a reading not consistent with its assigned receive transmission level point.

To perform a routine end to end level testing between a central office and an operator office is relatively expensive. The procedure requires two technicians one at each end to send and receive test tones. A communication link is also required between the two technicians for reporting to each one the results and configurations for each position tested. This makes the procedure slow, tying up an operator position for a relatively long period of time when the operator position could be generating revenue.

The present invention provides a solution to the above mentioned problems.

References generally relevant to the present invention include Piereth et al., U.S. Pat. No. 4,677,609; Fossati et al., U.S. Pat. No. 4,484,322; O'Neill, U.S. Pat. No. 4,602,133; and Terry, U.S. Pat. No. 4,445,002.

Piereth discloses semi-automated directory assistance systems to help an operator at an operator position terminal to find the requested directory number.

Fossati shows a circuit arrangement for suppressing noise due to reflected outgoing signals in a telephone system in which digitized signals are transmitted in two directions over a two-wire line.

O'Neill discloses an adaptive echo cancelling system and method utilizing linear code spacing.

Terry shows a sidetone circuit connected to the terminals of a two-line telephone system.

OBJECTS AND SUMMARY OF THE INVENTION

It is therefore an object of the present invention to provide an operator position with improved means for echo control, acoustic limiting, volume and sidetone level control.

It is also an object of the present invention to provide an operator position with telephone means having processing means for generating a power limited digital receive signal.

It is still an object of the present invention to provide an operator position with program means for controlling the operation of the processing means.

It is yet an object of the present invention to provide an operator position having echo control, acoustic limiting, and volume and sidetone control means with manual control of the operational parameters thereof.

It is a further object of the present invention to provide an operator position having echo control, acoustic limiting, and volume and sidetone control with operator interface for control thereof by the operator.

It is an object of the present invention to provide an operator position having maintenance capabilities for end to end level testing utilizing one technician.

It is still an object of the present invention to provide an operator position with means for transmitting and receiving test signals on software command.

It is also an object of the present invention to provide an operator position with a processor means for masking the impedance mismatch between a standard test equipment and the headset interface in an operator position.

It is yet a further object of the present invention to provide an operator position having a digital telephony circuit means which will not require any adjustment at manufacture.

It is an object of the present invention to provide an operator position having a digital telephony circuit means in which any adjustment in the field is done by software commands.

It is a further object of the present invention to provide an operator position with digital telephony circuit means which is relatively easier to manufacture.

It is also an object of the present invention to provide an operator position with digital telephony circuit means which is relatively more reliable.

In summary, it is an object of the present invention to provide an operator position with digital telephony circuit means for processing speech digitally to provide echo control, acoustic limiting, sidetone control and volume control within the complete control of the operator using the operator position and for providing maintenance savings in time and manpower.

DETAILED DESCRIPTION OF THE INVENTION

FIG. 1

Figure 1:
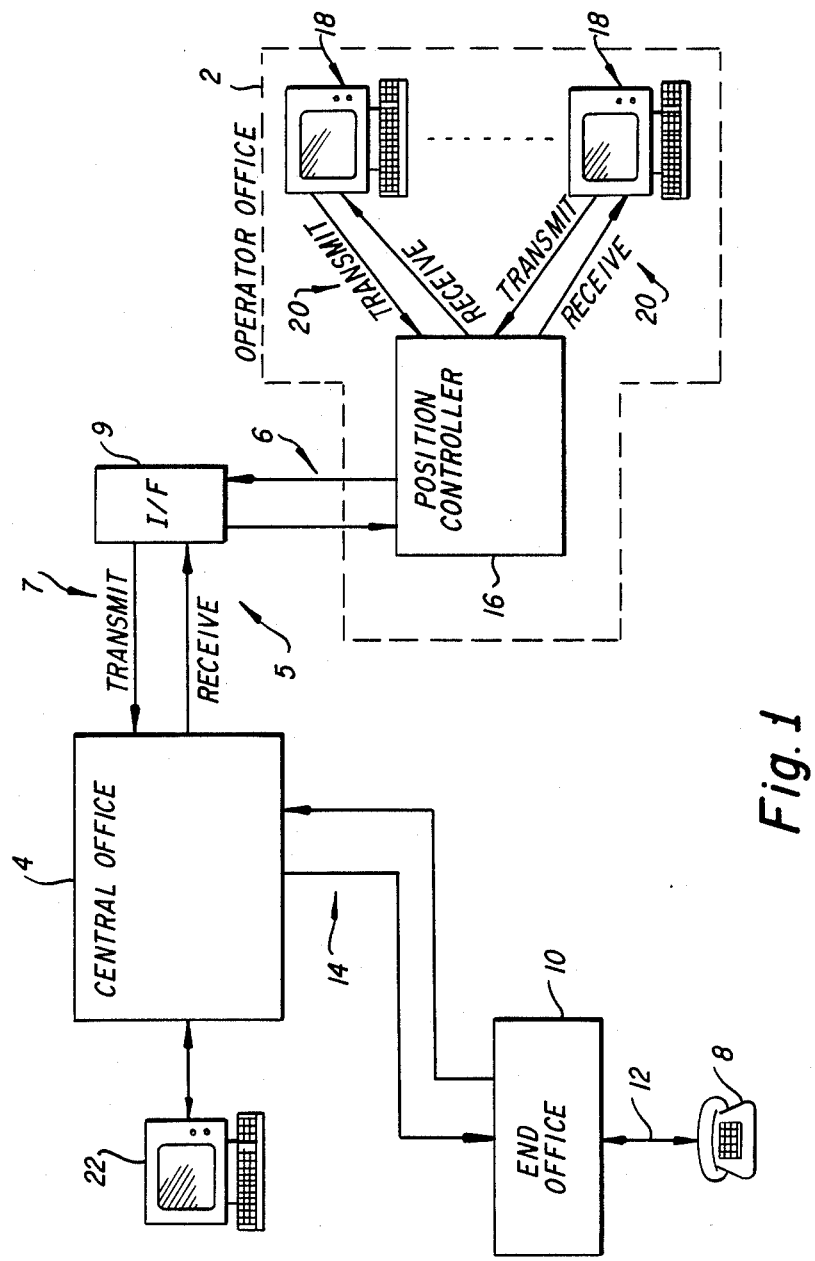
FIG. 1 is a schematic functional block diagram of an operator system for interconnecting an operator position in an operator office with a subscriber station.
Figure 2:
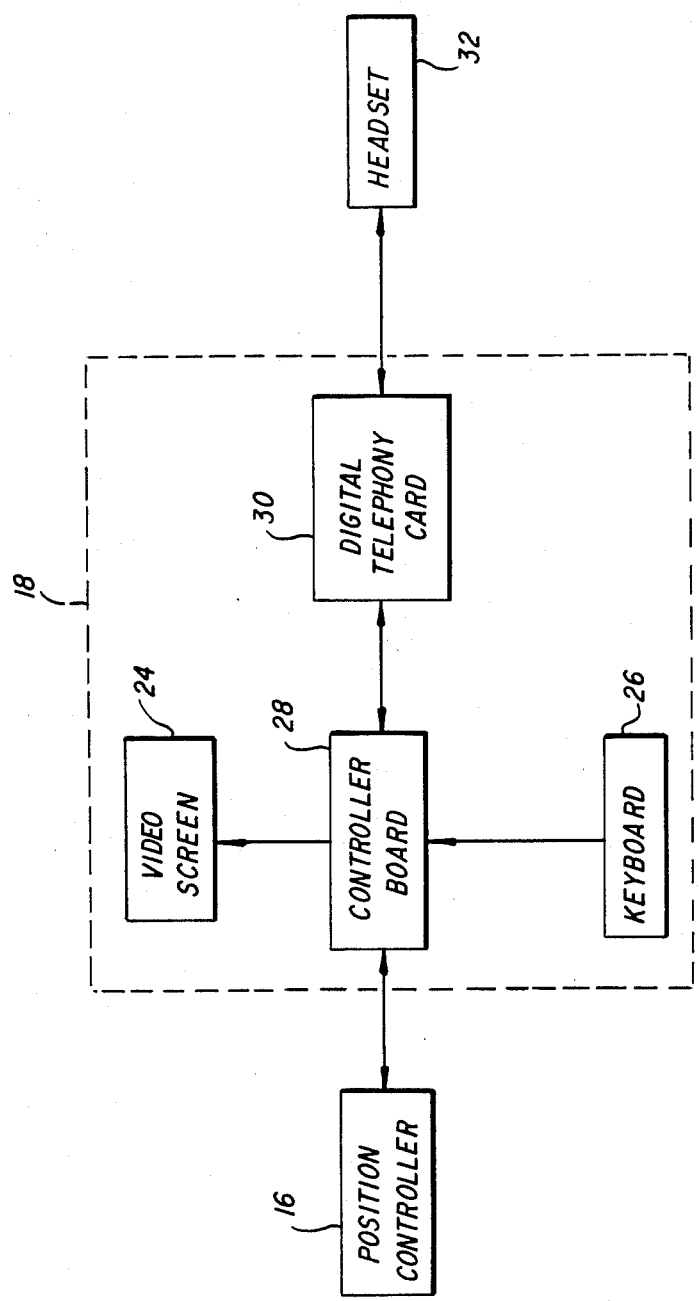
FIG. 2 is a functional block diagram of an operator position shown in FIG. 1.
Figure 3:
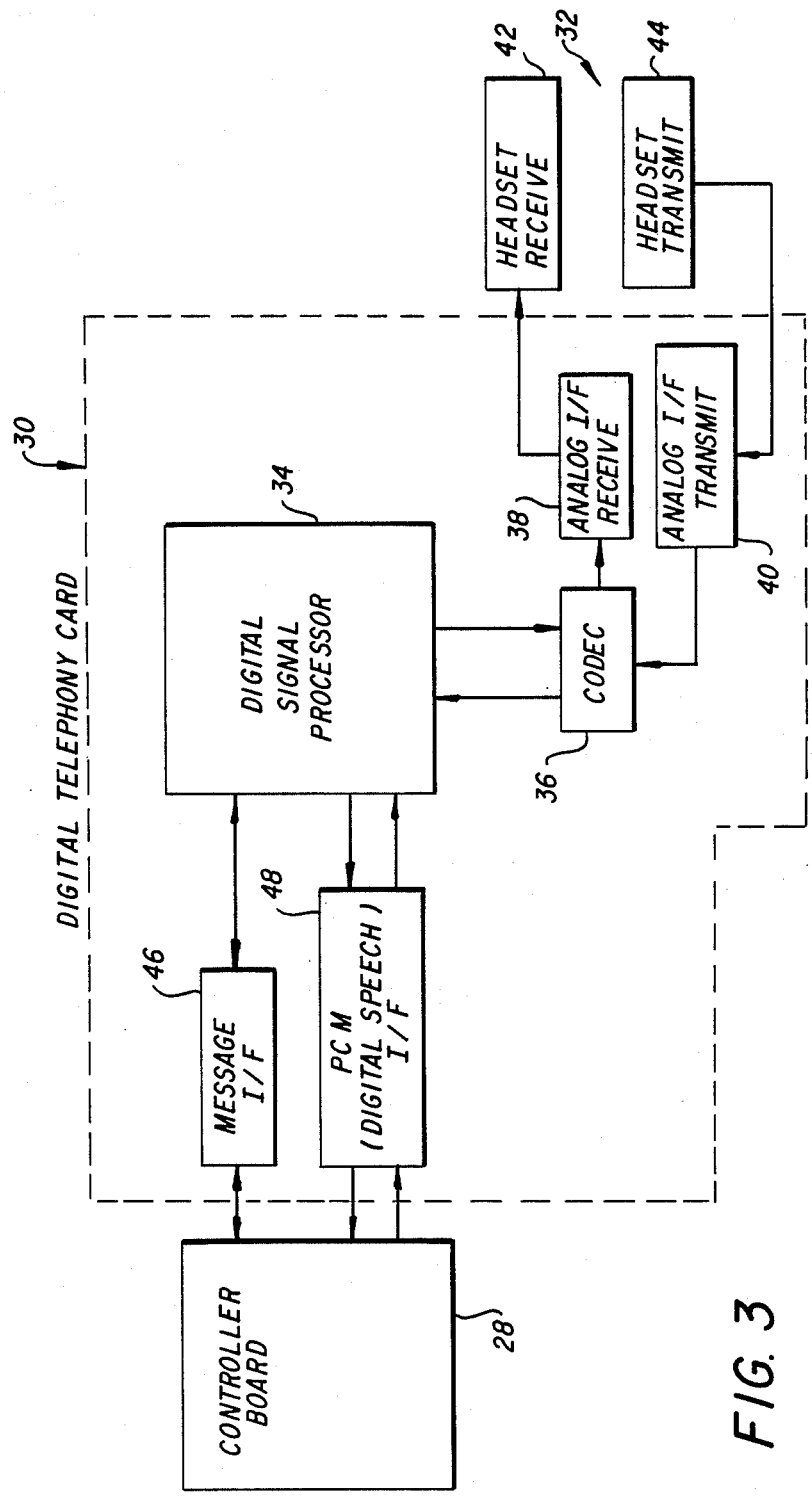
FIG. 3 is a functional block diagram of the digital telephony card shown in FIG. 2.
Figure 4:
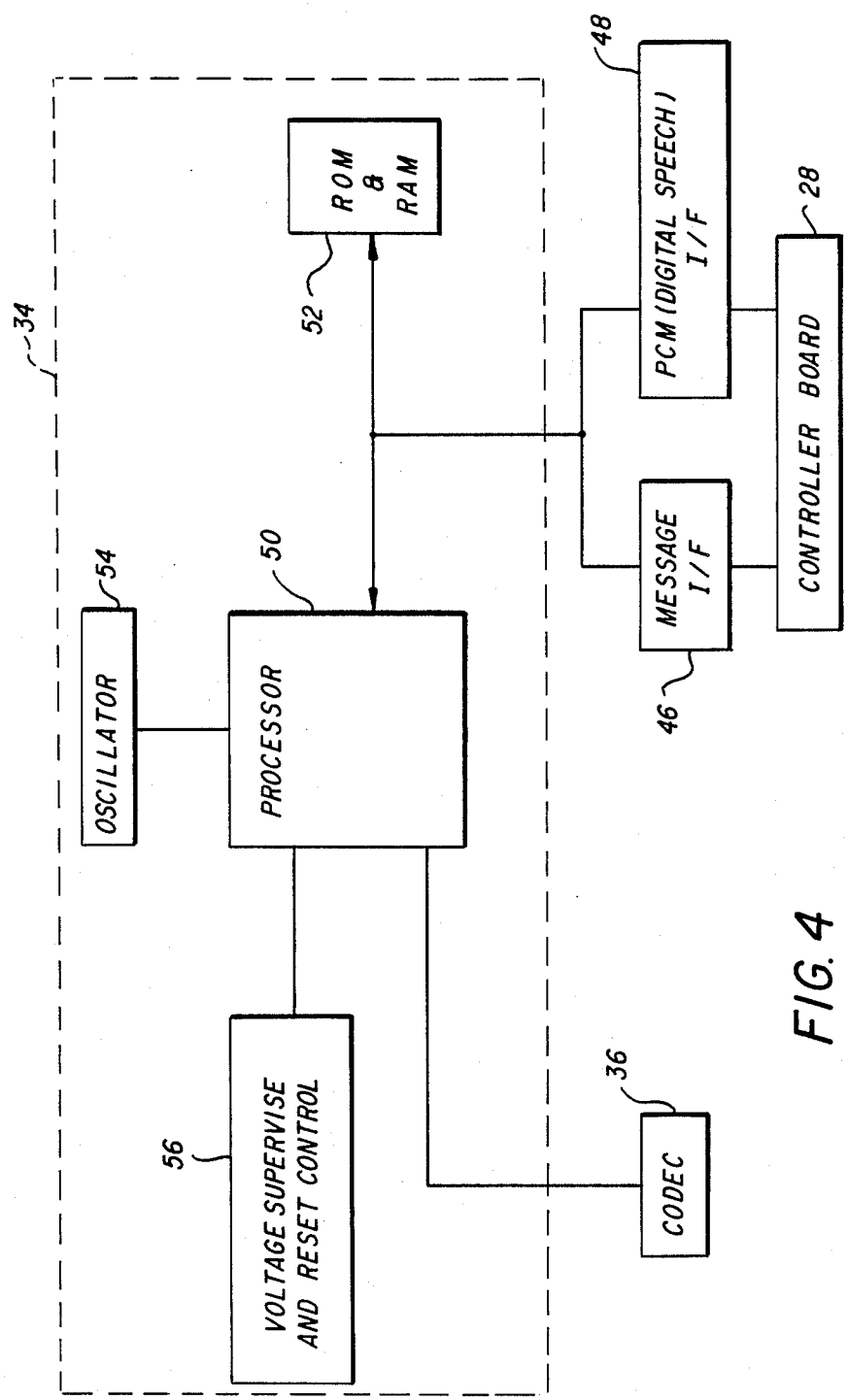
FIG. 4 is a functional block diagram of the digital signal processor shown in FIG. 3.

An operator system R comprises an operator office 2 interconnected to a central office 4 by transmission means 6. A subscriber station 8 is interconnected to an end office 10 by transmission means 12. End office 10 is interconnected by transmission means 14 to central office 4. Transmission means 5 comprises analog transmission means 6, digital transmission means 7 and interface equipment 9.

Operator office 2 comprises a position controller 16 serving a plurality of operator positions 18. Operator office 2 typically has several position controllers 16, each hooked up to several operator positions 18. However, only one position controller 16 is shown for clarity. Operator position 18 is connected to position controller 16 by a digital interface 20, which carries both voice and data. Transmission means 5 between operator position means 18 and central office 4 is typically two 4 wire connection, one 4 wire connection for voice and one 4 wire connection for data. While connection means 12 from end office 10 to the subscriber station 8 is typically a two wire connection, transmission means 14 may be 4 wire or 2 wire. A hybrid circuit (not shown) for transition from a two wire to a four wire system is used at end office 10. Echo can occur at the hybrid circuit juncture.

Only the audio transmission means are shown. There is a duplicate set of transmission means 5 for data transmission.

Central office 4 includes a maintenance and administrative (MAP) position 22 for maintenance and management purposes. MAP position 22 can send software commands to operator position means 18 for maintenance purposes, which are discussed below.

Transmission means 7 and 14, and connection means 20 carry digital signals while transmission means 6 and 12 carry analog signals. Interface equipment 9, end office 10 and position controller 16 provide the necessary digital/analog and analog/digital conversions.

FIG. 2

Operator position 18 comprises a video screen 24 and a keyboard 26 to provide the operator with input/output interface with operator position 18. A controller board 28, connected to the video screen 24 and keyboard 26, sends and receives digital signals from the position controller 16. A digital telephony card 30, connected to the controller board 28, processes digital speech in the form of pulse code modulation (PCM) signals and provides maintenance capabilities described hereunder. A headset 32 connects to digital telephony card 30 for transmitting and receiving analog speech to and from it. Controller board 28 provides control means for the digital telephony card 30. It will be understandable to a person skilled in the art that connection means from controller board 28 to position controller 16, digital telephony card 30, video screen 24, and keyboard 26 carry data, synchronization and control signals.

FIG. 3

Digital telephony card 30 comprises a digital signal processor 34 for processing PCM signals, a CODEC 36 for converting speech from analog to digital and from digital to analog, analog interface receive 38 for interfacing between CODEC 36 and headset receive 42, analog interface transmit 40 for interfacing between CODEC 36 and headset transmit 44, message interface 46 and digital speech interface 48 for interfacing between controller board 28 and processor 34.

The analog interface receive 38 converts unbalanced to balanced circuit for output to headset receive 42, matches the standard 300 Ohm load of headset receive 42, and contains a resistor pad required to interface from the CODEC 36. The analog interface transmit 40 converts balanced to unbalanced circuit for input to the CODEC 36, matches the standard 50 Ohm source impedance of headset transmit 44, contains a resistor pad required to interface to the CODEC 36, and contains the headset detect circuit. The headset interface is designed to meet BELLCORE Technical Requirement TR-NPL-000314, Issue 1, December 1987.

CODEC 36 is a standard -law or a-law PCM CODEC. CODEC 36, in addition to its function of converting signals from analog to digital and from digital to analog, provides an interface between the digital portions and the analog portions of digital telephony card 30.

FIG. 4

Digital signal processor 34 comprises a processor 50, memory means 52 coupled to processor 50, oscillator 54 for providing timing signals to processor 50, and voltage control and reset circuit 56. Processor 50 interfaces directly with CODEC 36. Processor 50 can transmit and receive test signals to central office 4. Processor 50 can also loop back test signals sent from central office 4 from the receive side to the transmit side.

All speech processing for providing echo control, acoustic limiting, volume control and sidetone control is done by processor 50.

Control signals are provided by controller board 28.

Figure 5:
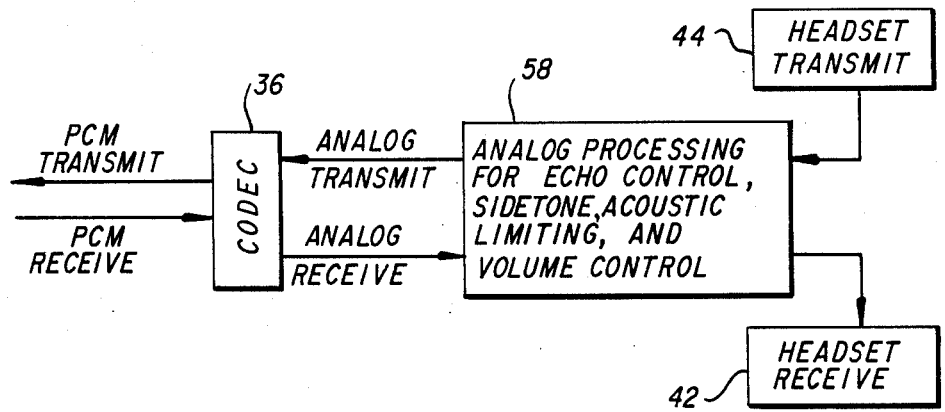
FIG. 5 is a functional block diagram of a prior art telephony card showing analog voice processing.
Figure 6:
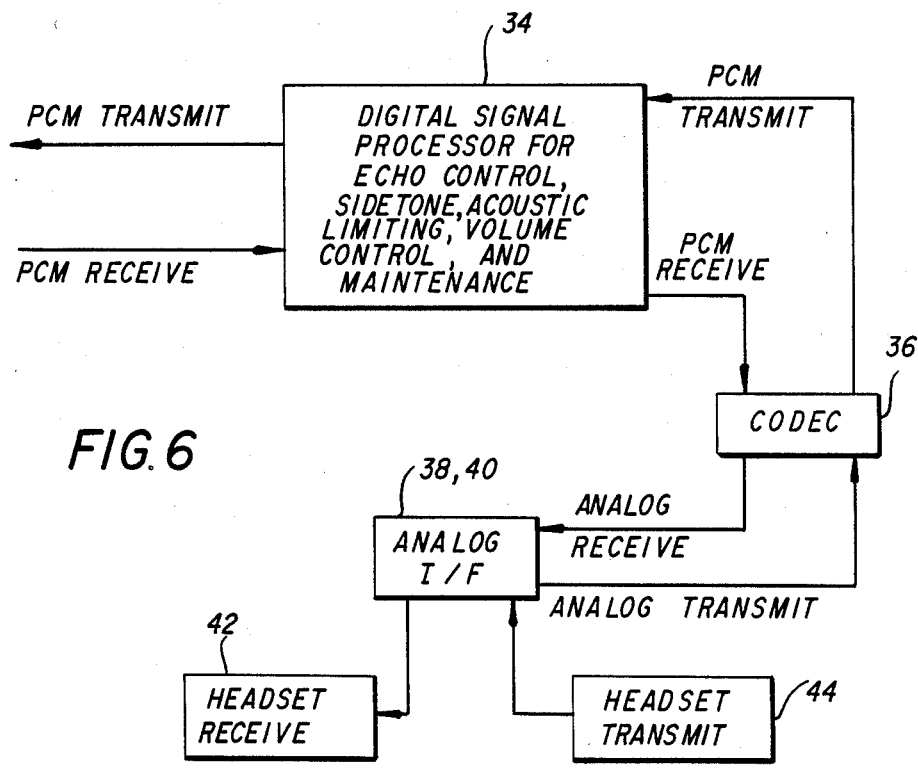
FIG. 6 is a functional block diagram of the digital signal processor shown, in 3, showing digital voice processing.
Figure 7:
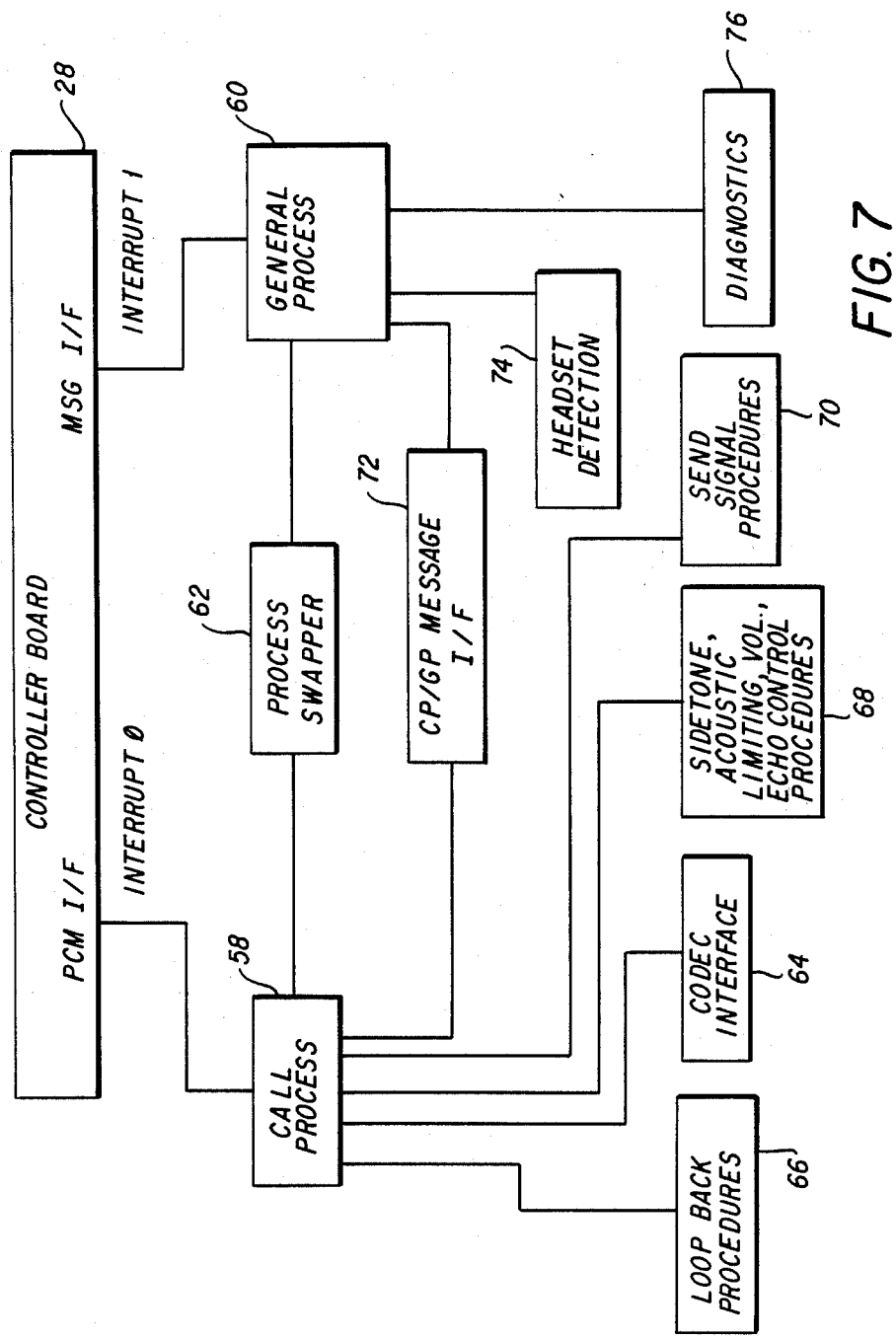
FIG. 7 is a software functional block diagram for the software controlling the operation of the telephony card of the present invention.

FIGS. 5 and 6

Prior art circuits in operator position 18 for processing voice signals to provide audio features for echo control, sidetone adjust, acoustic limiting and volume control are analog. As best shown in FIG. 5, CODEC 36 converts PCM receive signals to analog for processing by analog block 58. With analog block 58, sidetone levels, echo control and acoustic limiting parameters, and volume control are fixed at manufacture. The potentiometers which are used to adjust these audio characteristics at manufacture are normally inaccessible once the circuit is installed in the field, making any field adjustments difficult.

Under the present invention, voice processing is done digitally in digital signal processor 34, as best shown in FIG. 6. The standard criteria for echo control, sidetone level, acoustic limiting and volume level are implemented by intercepting PCM receive and transmit signals in processor 34 ahead of CODEC 36. This provides the flexibility of being able to adjust the parameters for echo control and acoustic limiting, volume control and sidetone level by software means which have not been possible before. In accordance with the present invention, attack and release times for echo control and acoustic limiting are adjustable through software commands sent by the operator to the digital telephony card 34. Additionally, new features such as maintenance requiring less manpower, time and equipment have been added.

FIGS. 7 AND 8

Software for controlling the operation of digital telephony card 30 is written in assembler code. Main control is provided by controller board 28.

Interrupt 0 and interrupt 1 are two main interrupts between controller board 28 and digital telephony card 30. Interrupt 0 is used for executing Call Process procedure block 58 for processing of PCM (digital speech) transmit and receive signals. Interrupt 0 is generated after completion of transfer of PCM data between CODEC 36 and processor 50. Interrupt 1 controls General Process procedure block 60 and occurs every time controller board 28 sends a message to digital telephony card 30.

Process Swapper procedure block 62 changes control from controller board 28 to either Call Process procedure block 58 or General Process procedure block 60 for swapping between the processes.

Call Process procedure 58 includes Codec Interface procedure block 64, Loop Back procedures block 66, Echo Control, Volume Adjust, Acoustic Limiter and Sidetone Adjust procedure block 68 and Send Signal procedures block 70. Call Process procedure block 58, among other tasks, reads headset transmit PCM, headset receive PCM, and calculates the power levels of the transmit and receive PCM.

Loop Back procedures block 66 performs the following loop back procedures for maintenance purposes.

Loops back signal from headset transmit 44 to headset receive 42 and passes the signal through to central office 4.

Loops back signal from central office 4 transmit side to the receive side and passes the signal through to the headset 32.

Loops back signal from headset transmit 44 to headset receive 42 and loops back signal from central office 4 transmit side to the receive side.

Send Signal procedures block 70 performs the following for maintenance purposes.

Sends a periodic digital milliwatt signal or idle channel termination from the digital side of headset receive to enable monitoring of the analog headset receice.

Transmits a periodic digital milliwatt signal or idle channel termination to central office 4 from the digital side of headset 32.

Transmits a periodic digital milliwatt signal or idle channel termination to both headset 32 and central office 4.

Commands to digital telephony card 34 are handled through General Process procedure block 60. Some of the available commands are:

Send signal to headset receive 42 or central office receive side. This command sends a signal to headset 32, sends a signal to central office 4, or sends a signal to both.

Modify the operator's audio interface. This command turns sidetone, acoustic limiting, and echo control on or off.

Set sidetone level. This command sets the sidetone loss, from headset transmit level to headset receive level, in dB.

Set acoustic limiter attack time.

Set acoustic limiter release time.

Headset transmit power level. This command measures the headset transmit power level and transmits the level to the controller board 28.

Headset receive power level. This command measures the receive power level from central office 4 and transmits the level to the controller board 28.

Mask headset 600 Ohm impedance mismatch.
Set echo control attack time.
Set echo control release time.
Volume down.
Volume up.

Figure 8:
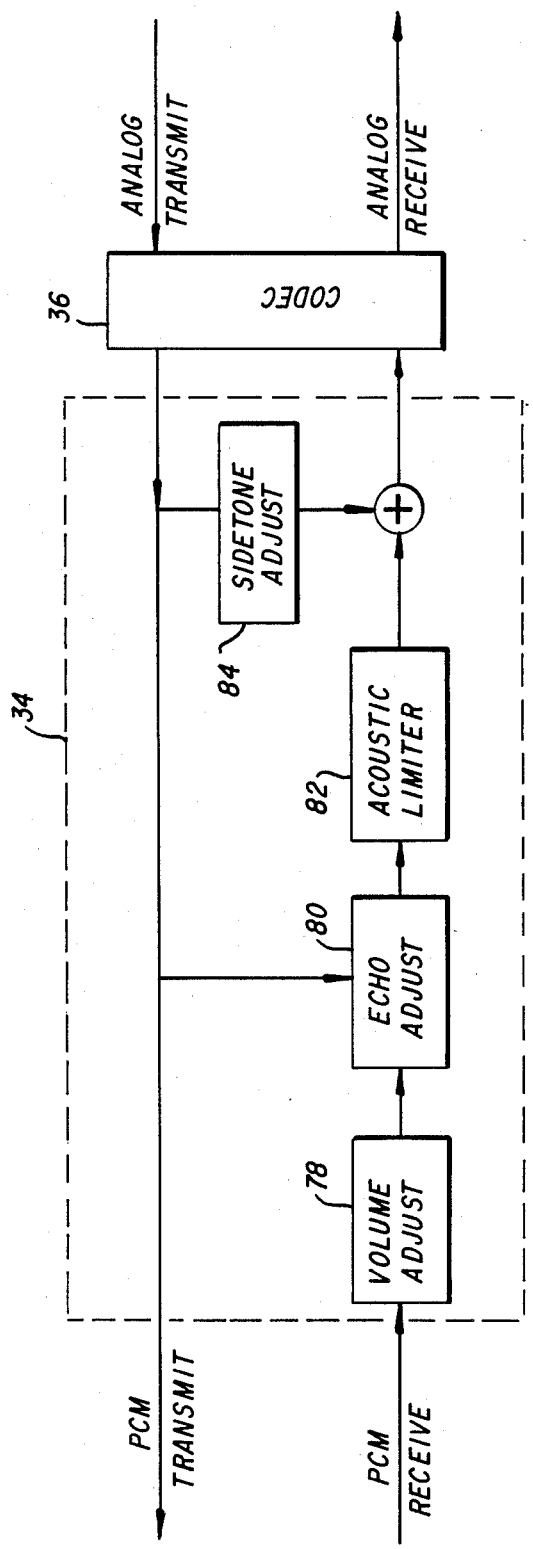
FIG. 8 is a schematic functional block diagram showing the order of calculations for implementing volume adjust, echo control, acoustic limiting and sidetone adjust on PCM (digital speech) receive signal before input to operator headset receive.

Procedure block 68 calculates the proper headset receive PCM power level after implementing echo control, acoustic limiting, sidetone level and volume level. As best shown in FIG. 8, volume adjust block 78 reads PCM receive level and calculates the allowed maximum volume. Echo adjust block 80 reads the output of volume adjust block 78 and the level of PCM transmit signal and calculates the allowed maximum echo. Acoustic limiter block 82 reads the output of echo adjust block 80 and calculates the maximum allowed level. The output of acoustic limiter block 82 and the output of sidetone adjust block 84 are combined for input to CODEC 36 where the resultant PCM signal is converted to analog for input to headset receive 42.

Figure 9:
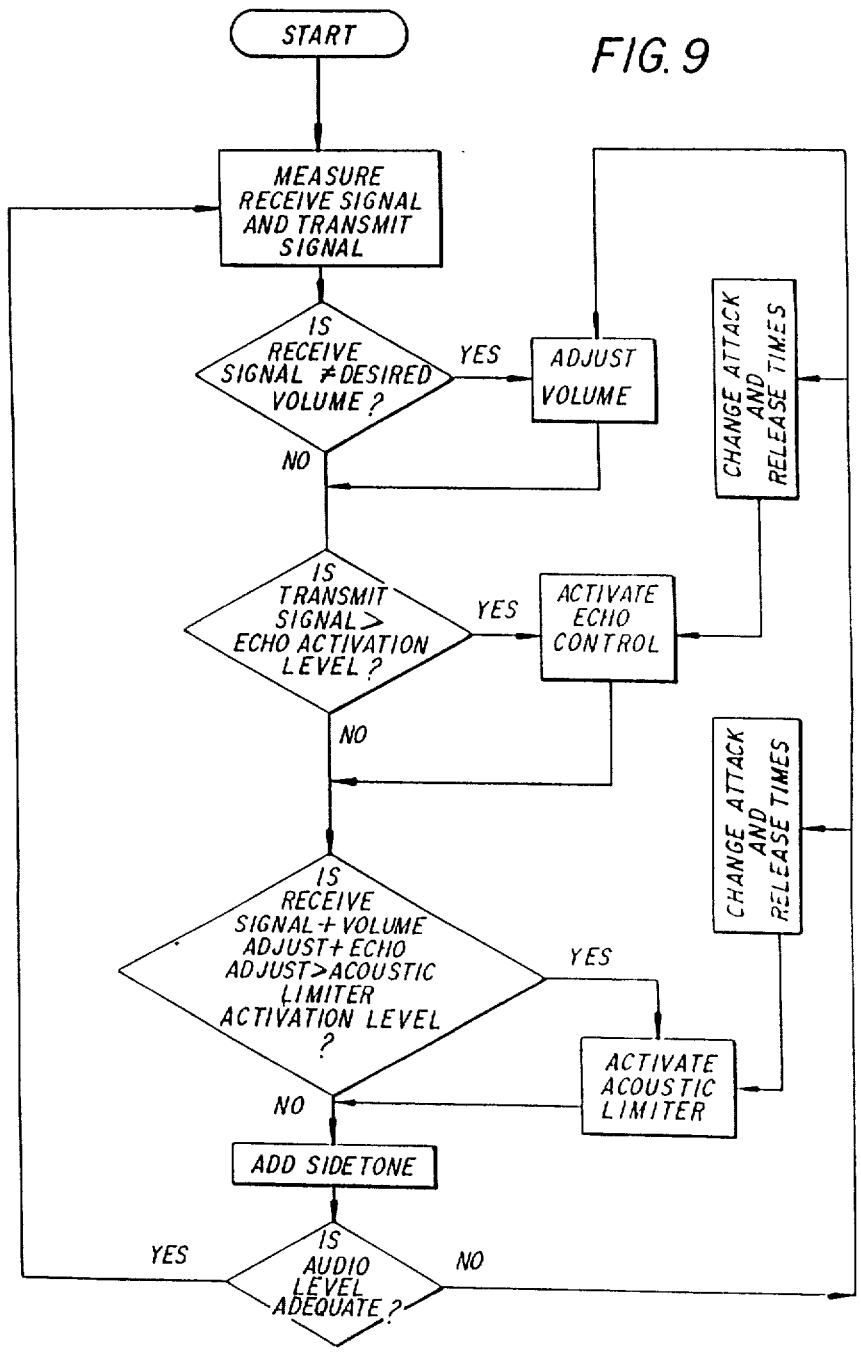
FIG. 9 is a functional flowchart diagram illustrating the procedure used by the present invention.

As best shown in FIG. 9, the digital signal processor 34 measures the power level of the receive and transmit signals. If the received signal is greater than or less than the desired level, then volume adjust is executed. Next, the transmit signal level is compared with the activation level of the echo control procedure. If the transmit signal is greater than the echo activation level, then the echo control procedure is activated. The echo control procedure uses default values of attack and release times. However, the operator can set the attack and release times at different values for the echo control procedure. After echo adjust or if the transmit signal is not greater than the echo activation level, the receive signal after volume adjust and echo adjust is compared to the activation level of the acoustic limiter procedure. If the receive signal is greater, then the acoustic limiter procedure is executed. The acoustic limiter procedure uses default values of attack and release times. However, the operator can set different attack and release times for the procedure. Sidetone is then added to the receive signal. After the receive signal has undergone volume adjust, echo adjust, acoustic limiter and sidetone adjust, the operator decides if the level of the receive signal is proper. If not, the operator sets the volume up or down and/or changes the default attack and release times for echo control and acoustic limiter. In this manner, the operator has complete control over the audio quality of the receive signal.

Procedure block 72 provides the message interface between Call Process procedure block 58 and General Process procedure block 60. Headset detection block 74 informs the controller board 28 if headset 32 is plugged in. Diagnostics procedure block 76 provides diagnostics maintenance to digital telephony card 30.

OPERATION ECHO CONTROL

FIG. 10

Figure 10:
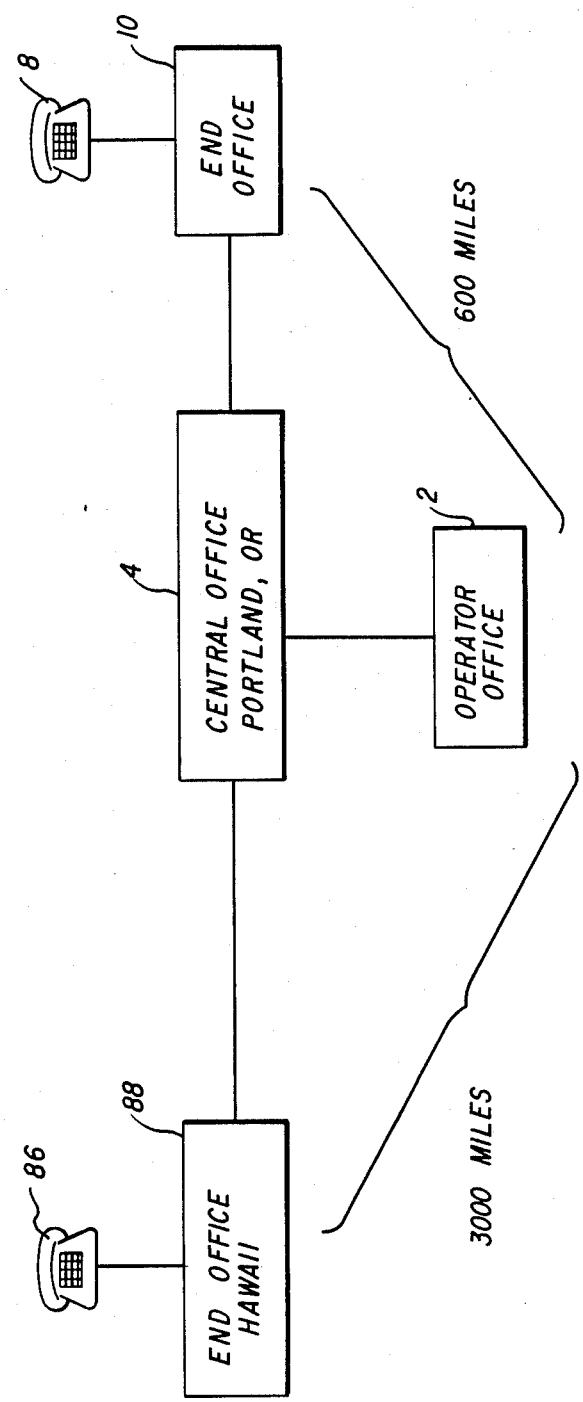
FIG. 10 is a schematic functional block diagram of an operator system serving two disparate geographic regions.

Standard attack and release times for echo control are approximately 100 milliseconds which are adequate for the average distance of the operator from the hybrid circuit, where operator echo is generated. For most purposes, the standard times, which are set at manufacture, are adequate. However, in a situation where operator office 2 is requested to handle a subscriber station 86 in end office 88 which is outside the normal geographic service area of operator office 2, the standard times for echo control are wholly inadequate, resulting in no echo control. For a situation depicted in FIG. 10, where end office 88 in Hawaii is approximately 3000 miles from operator office 2 in Portland, Ore., the required attack and release times are approximately 500 milliseconds. This means that upon the occurrence of speech in the headset transmit 44, one-half the required loss to attenuate the anticipated echo should be inserted in the receive path by 500 milliseconds. In a prior art analog telephony card where the times are fixed at 100 milliseconds, having 500 milliseconds of attack and release times is not possible. With the use of the invention, digital telephony card 30 is simply provided with a command through the keyboard 26 to change the default attack and release times. The operator has now complete control. In fact, the operator can try several increments of attack and release times until he finds the level of echo that he can tolerate. Because of this dynamic interface between the digital telephony card 30 and the operator, echo control becomes an echo canceller without the complicated circuitry normally used in implementing an echo canceler.

OPERATION SIDETONE LEVEL, ACOUSTIC LIMITER AND VOLUME LEVEL

Sidetone level is adjustable in 0.25 dB steps. Digital telephony card 30 measures the headset transmit level, adds loss to it, and sends it to headset receive 42. The industry standards require a 12 dB loss; however, by sending the appropriate command to the digital telephony card 30 through keyboard 26 to set the sidetone loss to a different level, the operator can have variable sidetone level.

Acoustic limiter protects the operator from loud tones, such as a whistle or a coin drop tone in a pay phone. Normal attack time is 10 milliseconds and release time, 100 milliseconds. With the appropriate command to the digital telephony card 30 through the keyboard 26 of operator position 18, attack and release times for the acoustic limiter can be easily changed.

Likewise, for volume control, a simple keyboard command can change the volume up or down to suit the operator.

OPERATION MAINTENANCE

The digital telephony card 30 contains a PCM level meter and a 1004 Hz 0dmB0, (digital milliwatt), transmitter. This provides the capability of testing and adjusting the transmission lines between central office 4 and operator position 18 entirely from the MAP position 22 at central office 4. A software command from MAP position 22 is sent to digital telephony card 30 to instruct it to transmit a test tone. A technician at MAP position 22 monitors the received test tone. The technician sends a test tone to digital telephony card 30. A software command is sent to telephony card 30 to report the headset receive level and the technician checks the reported level.

Transmission level testing involves sending a signal through the system at a known level and using a meter to verify the level at the system test points. Routine transmission level maintenance for operator office 2 requires two technicians and one transmission level test set. A first technician, stationed at central office 4, sends a test signal to operator position 18. A second technician, stationed at operator position 18, monitors the headset receive 42 to determine if he is receiving the proper level. The second technician then sends a test signal from the headset transmit 44 to the central office 4. The first technician at the central office 4 monitors the level of the test signal to determine if he is receiving the proper level.

The test set used in transmission level maintenance is not compatible with the receive and transmits analog interfaces 38 and 40 in the digital telephony card 30. The test equipment does not have a setting for 50 Ohm source impedance and/or 300 Ohm load impedance. This means that the technicians must use non-standard procedures to compensate for impedance mismatch. Otherwise, readings taken at the central office 4 or at the operator position 18 would be erroneous.

In accordance with the present invention, the problem with impedance mismatch is easily rectified. Digital telephony card 30 can adjust signals in both headset transmit 44 and headset receive 42 to match the impedance mismatch of the headset interface circuits 38 and 40 with the transmission test equipment. A software command is sent to the digital telephony card 30 to carry out a procedure to mask the impedance mismatch. The procedure adds gain to headset transmit and headset receive. The first technician from the central office 4 sends a test tone. The second technician at operator position 18 reads the result, which is consistent with the headset receive transmission level point. The second technician injects the standard test tone into headset transmit 44 and the first technician reads the result which is consistent with the central office transmission level point.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention o the limits of the appended claims.

I claim:

1. A device for establishing a desired operator audio level in an operator position means, comprising:
   (a) processor means for processing digital signals for generating a desired receive audio level in an operator position means for use by an operator;
   (b) conversion means for converting analog speech transmit signal from a telephone transmit means to digital for input to said processor means and for converting digital receive signal from said processor means to analog receive signal for input to a telephone receive means;
   (c) means for connecting said processor means to a telecommunications network; and
   (d) said processor means including control means for said operator for permitting said operator to modify the desired receive audio level.

2. A device, as in claim 1, wherein:
   (a) said processor means includes volume control means for said digital receive signal for permitting said operator to modify the volume of said digital receive signal.

3. A device, as in claim 1, wherein:
   (a) said processor means includes echo control means for attenuating said digital transmit signal when it is reflected as an echo.

4. A device, as in claim 3, and including:
   (a) means for modifying the operation of said echo control means for thereby setting the level of said echo as desired.

5. A device, as in claim 1, wherein:
   (a) said processor means includes acoustic limiting means for attenuating the power level of said digital receive signal for thereby protecting said operator from injurious power levels.

6. A device, as in claim 5, and including:
   (a) means for modifying the operation of said acoustic limiting means for thereby setting the level of said digital receive signal to a different level.

7. A device, as in claim 3, wherein:
   (a) said operator control means includes means for setting the attack and release times of said echo control means.

8. A device, as in claim 5, wherein:
   (a) said operator control means includes means for setting the attack and release times of said acoustic limiting means.

9. A device, as in claim 1, wherein:
   (a) said processor includes means for transmitting a test signal to remote location for level testing maintenance.

10. A device, as in claim 9, wherein:
    (a) said processor means includes means for detecting a test signal transmitted from said remote location and means for reporting the level of said signal as received by said processor means.

11. An operator position means for connecting to a telecommunications network for use by an operator for providing assistance to a subscriber connected to said network, comprising:
    (a) telephone means having analog transmit and receive means for permitting said operator to communicate with said subscriber;
    (b) said telephone means including digital transmit and receive means for transmitting and receiving, respectively, digital signals;
    (c) said digital transmit and receive means including processor means for processing said digital transmit and receive signals for generating a power limited digital receive signal; and
    (d) said digital transmit and receive means including means for converting analog transmit signal to said digital transmit signal and for converting said power limited digital receive signal to analog receive signal for input to said telephone receive means.

12. An operator system, as in claim 11, wherein:
    (a) said processor means includes programmable means for controlling the operation thereof.

13. An operator system, as in claim 11, wherein:
    (a) said processor means includes means for echo control of operator speech.

14. An operator system, as in claim 13, wherein:
    (a) said echo control means includes operator control means for permitting said operator to vary the echo to the operator's tolerance.

15. An operator system, as in claim 11, wherein:
    (a) said processing means includes means for sidetone level adjustment for permitting said operator to hear his speech at a reduced level.

16. An operator system, as in claim 11, wherein:
    (a) said processing means includes acoustic limiting means for attenuating high tones for protecting said operator therefrom.

17. An operator system, as in claim 16, wherein:

(a) said acoustic limiting means includes means for permitting adjustment of the level of high tones.

18. An operator system, as in claim 11, wherein:
(a) said processing means includes volume adjustment means for controlling the volume of said analog receive signal.

19. An operator system, as in claim 18, wherein:
(a) said volume adjustment means includes operator control means for permitting said operator to adjust the level of volume as desired by said operator.

20. An operator system in a telecommunications network for providing assistance to a subscriber connected to said network, comprising:
(a) a subscriber station for connecting to a network for use by a subscriber;
(b) an operator position means in an operator office for connecting to said network for use by an operator;
(c) interconnection means for connecting said subscriber station to said operator position means;
(d) said operator position means including telephone means having analog transmit and receive means for permitting said operator to communicate with said subscriber;
(e) said telephone means including digital transmit and receive means for transmitting and receiving, respectively, digital signals;
(f) said digital transmit and receive means including processor means for processing said digital transmit and receive signals for generating an audio level controlled digital receive signal; and
(g) said processor means including means for converting analog transmit signal to said digital transmit signal and for converting said power limited digital receive signal to analog receive signal for input to said receive means 21. An operator system, as in claim 20, wherein:
(a) said processor means includes operator control means for manually controlling the level of said controlled digital receive signal.

22. An operator system, as in claim 20, wherein:
(a) said controlled digital receive signal includes volume control.

23. An operator system, as in claim 20, wherein:
(a) said controlled digital receive signal includes echo control.

24. An operator system, as in claim 20, wherein:
(a) said controlled digital receive signal includes acoustic limiting control.

25. An operator system, as in claim 20, wherein:
(a) said controlled digital receive signal includes sidetone control.

26. A maintenance system for performing level testing for an operator system having a first end and a second end, comprising:
(a) a central office at said first end having a technician station;
(b) an operator position means at said second end;
(c) interconnection means for connecting said central office to said operator position means;
(d) means for sending a first test signal from said central office;
(e) said operator position means including means for sensing the received power level of said first test signal sent from said central office;
(e) said sensing means including means for reporting the received power level to said central office;
(f) said operator position means including means for transmitting a second test signal to said central office; and
(g) said transmitting means including means for reporting the power level of said second test signal to said central office technician station.

27. A maintenance system, as in claim 26, wherein:
(a) said operator position means includes programmable means for responding to a first instruction from said technician station to report the power level of said received first test signal.

28. A maintenance system, as in claim 27, wherein:
(a) said programmable means includes means for responding to a second instruction from said technician station to transmit said second test signal.

29. A maintenance system, as in claim 26, wherein:
(a) said operator position means includes means for masking an impedance mismatch between a test equipment and said operator position means.

30. A maintenance system, as in claim 29, wherein:
(a) said operator position means includes programmable means for responding to a third instruction from said technician station for masking the impedance mismatch.

31. A method for performing level testing for an operator systems having a central office at a first end, operator position means at a second end and interconnection means between said first and second ends, comprising the steps of:
(a) providing a first technician station at said central office at said fist end;
(b) providing means for sending a first test signal from said central office;
(c) providing means, in said operator position means at said second end, for sensing the received power level of said first test signal sent from said central office;
(d) providing means, in said operator position means responsive to a first instruction from said central office, for reporting the received power level to said central office;
(e) providing means, in said operator position means responsive to a second instruction from said central office, for transmitting a second test signal to said central station; and
(f) providing means, in said operator position means, for reporting the power level of said second test signal to said central station.

32. A method for establishing a desired operator audio level in an operator position means, comprising the steps of:
(a) converting analog transmit signal from a telephone transmit means to digital;
(b) measuring the power level of digital receive and transmit signals;
(c) comparing the level of said digital receive signal to a desired level;
(d) modifying the level of said digital receive signal to attain the desired level; and
(e) converting said digital receive signal, after modification, to analog for input to a telephone receive means.

* * * * *

UNITED STATES PATENT AND TRADEMARK OFFICE
CERTIFICATE OF CORRECTION

PATENT NO. : 4,879,738

DATED : November 7, 1989

INVENTOR(S) : John F. Petro

It is certified that error appears in the above-identified patent and that said Letters Patent is hereby corrected as shown below:

Insert one (1) sheet of drawing bearing Figure 9, attached herewith.

Column 1, line 18, delete "5"; and line 44, change "los" to -- loss --.

Column 5, line 18, change "-law" to -- u-law--.

Signed and Sealed this

Twenty-second Day of May, 1990

Attest:

Attesting Officer

HARRY F. MANBECK, JR.

Commissioner of Patents and Trademarks